Feb. 14, 1928.
G. W. PROUTY
1,659,159
CUTTING MECHANISM FOR WRAPPING MACHINES
Filed Jan. 11. 1924
2 Sheets-Sheet 1
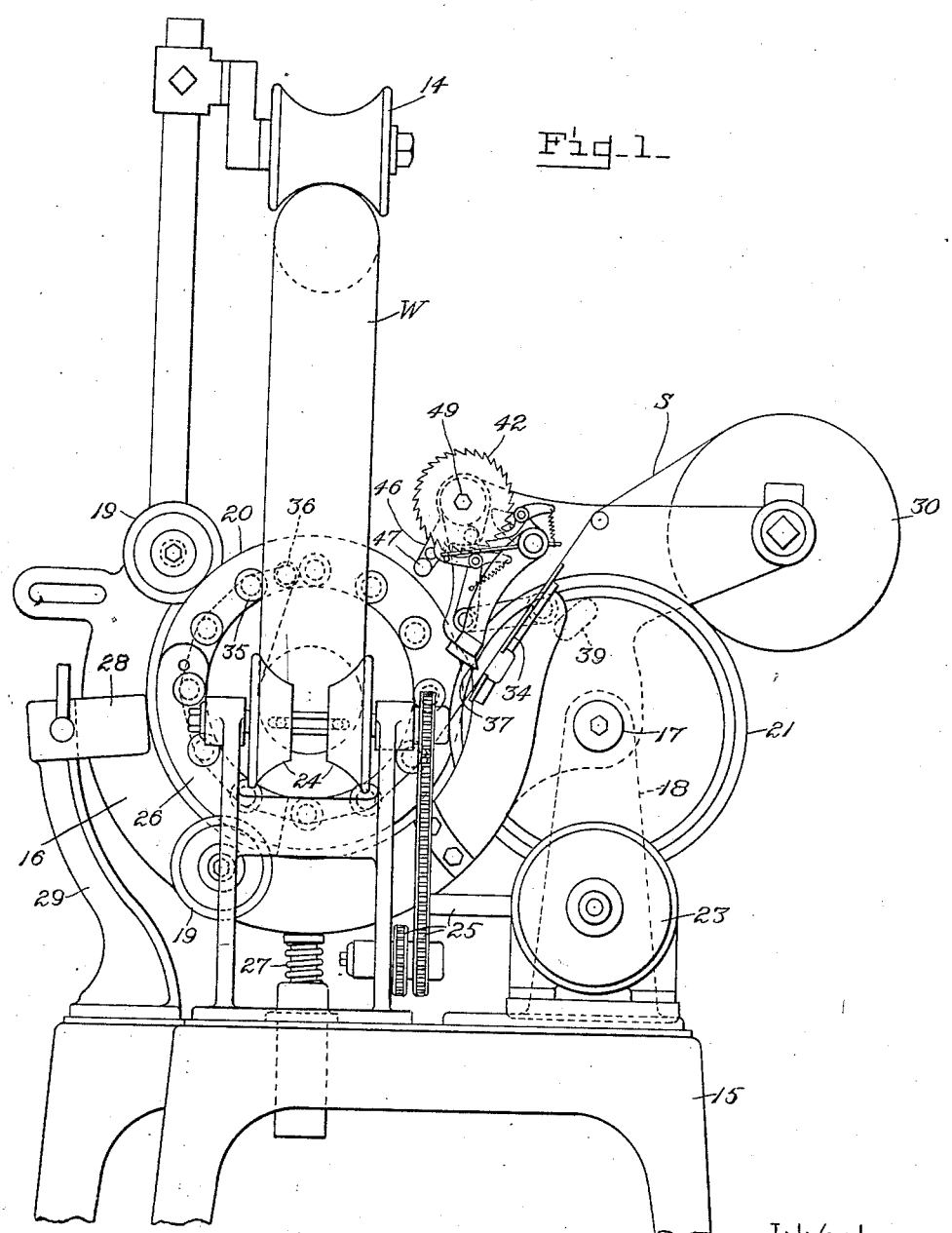
Fig-1-
INVENTOR:
George W. Prouty
By MacLeod, Calver, Copeland & Dike
ATTORNEYS.

Feb. 14, 1928.
G. W. PROUTY
1,659,159
CUTTING MECHANISM FOR WRAPPING MACHINES
Filed Jan. 11, 1924  2 Sheets-Sheet 2
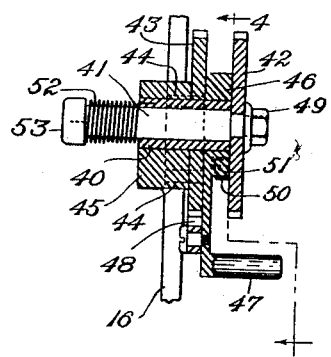
Fig-3-
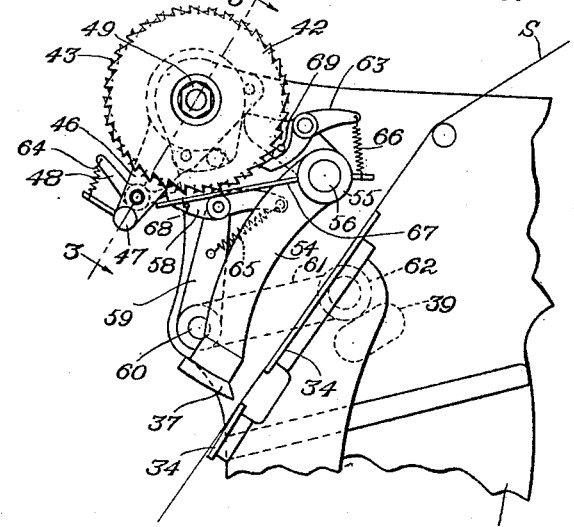
Fig-2-
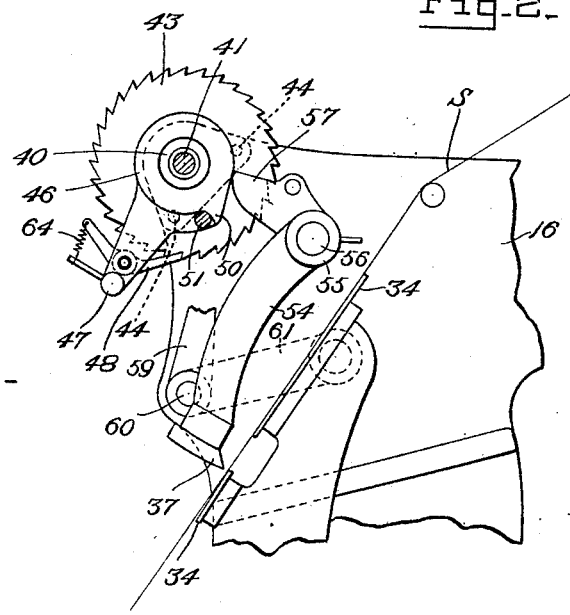
Fig-4-
INVENTOR=
George W. Prouty,
By Macleod, Calver, Copeland & Dike,
ATTORNEYS.

Patented Feb. 14, 1928.

1,659,159

UNITED STATES PATENT OFFICE.

GEORGE W. PROUTY, OF BOSTON, MASSACHUSETTS, ASSIGNOR TO TERKELSEN MACHINE COMPANY, OF BOSTON, MASSACHUSETTS, A CORPORATION OF MASSACHUSETTS.

CUTTING MECHANISM FOR WRAPPING MACHINES.

Application filed January 11, 1924. Serial No. 685,716.

This invention relates to wrapping machines of the general type shown and described in my prior application for Letters Patent filed June 21, 1921, Serial No. 479,410, and adapted primarily for wrapping annular objects, such, for example, as automobile tires, coils of wire, etc.

A machine of this type comprises a work support by which the object to be wrapped is gradually turned, an annular shuttle which is rotated about the work as the latter is moved therethrough, a reel or the like removed from the shuttle for supplying to the latter wrapping material in the form of a continuous strip which is wrapped about the shuttle as the latter is rotated to wrap said strip about the work, and means between the shuttle and the source of supply for cutting the strip of wrapping material after a sufficient quantity thereof has been wrapped upon the shuttle to complete the wrapping of a given object.

The present invention relates to the strip cutting mechanism of machines of this type and has for its object to provide means whereby this mechanism may be readily adjusted in accordance with the requirements of the work. Said mechanism is also preferably provided with means for automatically resetting the same after the cutting operation, so as to leave the parts in condition to operate during the next succeeding wrapping operation without attention on the part of the operator except when the character of the work is so changed as to require a greater or less length of wrapping strip and a consequent readjustment of the mechanism.

The foregoing and other objects of the invention, together with means whereby the same may be carried into effect, will best be understood from the following description of one form or embodiment thereof illustrated in the accompanying drawings. It will be understood, however, that the particular construction and arrangement described and shown have been chosen for illustrative purposes merely, and that the invention, as defined by the claims hereunto appended, may be otherwise practised without departure from its spirit and scope.

In said drawings:

Fig. 1 is a front elevation of a wrapping machine having cutting mechanism embodying the invention.

Fig. 2 is an enlarged front elevation of said cutting mechanism.

Fig. 3 is a section on the line 3—3, Fig. 2.

Fig. 4 is a section on the line 4—4, Fig. 3.

The frame of the wrapping machine herein shown comprises a base 15 and a yoke 16 which is pivotally mounted on a shaft 17 journalled in an upright 18 rising from the base 15. The yoke 16 is provided with guide rollers 19 for an annular shuttle 20 which is rotated by a driving member in the form of a friction disk 21 secured to the shaft 17 and driven (through connections not shown in detail) from an electric motor 23. The wire coil or other work W to be wrapped is held by a weighted roller 14 upon work supporting rollers 24 (only one of which is shown in Fig. 1) which are driven, through connections generally indicated at 25, from the motor 23, the arrangement being such that the work W will be turned relatively slowly with respect to the speed of rotation of the shuttle 20. Said shuttle is formed with a hinged segment 26 normally closing a gap through which the work W may be inserted, while the yoke 16 may be adjusted about the axis of the shaft 17 to center the shuttle 20 with respect to annular objects of different sizes, said yoke being counterbalanced by a spring 27 and being locked in adjusted position by means of a clamp 28 on an upright 29 rising from the base 15. The wrapping material, preferably in the form of a continuous strip S of paper, is supplied from a roll 30 carried by the yoke 16 and from which said paper passes over a guide plate 34 to the shuttle 20. Said shuttle 20 comprises an annulus having on one face a circular series of rollers 35 about which the strip S is wrapped when the shuttle is rotated, said strip being fed from the shuttle about a guide roller 36 to the work W. Between the shuttle 20 and the source of supply 30 there is provided a cutting mechanism comprising a knife 37 co-operating with a portion of the guide plate 34 to sever the strip S when a sufficient length thereof has been wound around the shuttle rollers 35 to complete the wrapping of the work W. The knife 37 is automatically actuated, as hereinafter more fully explained, after a predetermined number of rotations of the driving disk 21, by controlling mechanism actuated at each rotation of said driving disk by a cam projection 39 thereon, said controlling mechanism being manually adjustable in accordance with the size of the articles wrapped.

From the foregoing, the purpose, relative location, and function of the several instrumentalities of the machine will be sufficiently understood for the purpose of the present case. With the exception of the cutting and controlling mechanism, and in so far as the other parts enter into combination therewith, as pointed out in the claims, the latter parts may be of any suitable construction and arrangement.

The cutting and controlling mechanism constituting the present invention, as herein shown, is constructed and arranged as follows:—Mounted in an opening in a suitably disposed boss 45 on the yoke 16 is a bushing 40 in which is journalled a shaft 41 to the forward end of which is secured, as by a nut 49, a ratchet wheel 42. A second ratchet wheel 43 is mounted on the exterior of the bushing 40 at the forward side of the yoke 16 and is secured in fixed position to the latter by pins 44, the teeth of said ratchet wheel 43 being oppositely disposed with respect to those of the ratchet wheel 42. Rotatably mounted on the bushing 40 between the ratchet wheels 42 and 43 is an adjusting member 46 having an operating handle 47 by means of which said member may be turned into any desired angular position of adjustment. Said adjusting member is provided with a pawl 48 co-operating with the ratchet 43 for locking said adjusting member in adjusted position, and is formed with a shoulder 50 constituting a stop which is engaged by a pin 51 on the ratchet wheel 42 to determine the initial or starting position of the latter in accordance with the adjustment of the parts. Surrounding the rear end of the shaft 41 is a torsion spring 52 secured at one end to a head 53 on said shaft and at its opposite end to the bushing 40, said spring tending normally to turn the ratchet wheel 42 in a counterclockwise direction, as shown, to cause the pin 51 to engage the shoulder 50. The knife 37 is carried by an arm 54 on a hub 55 mounted to turn on a stud 56 projecting from the yoke 16, said hub having a second arm 57 which is engaged by the pin 51 on the ratchet 42 when the latter is turned in a clockwise direction to actuate said knife. The ratchet 42 is progressively rotated during the wrapping operation by means of a pawl 58 on one arm of a bell crank 59 pivoted at 60 to the yoke 16 and the other arm 61 of which is provided with a cam roller 62 cooperating with the cam projection 39 on the shuttle driving disk 21, whereby said ratchet wheel is advanced one tooth in a clockwise direction for each rotation of said driving disk. Said ratchet is held in its advanced position after each actuation by the pawl 58 by a detent pawl 63 carried by the arm 57. The pawls 48, 58 and 63 are normally held in operative engagement with their respective ratchets by means of springs 64, 65 and 66, respectively. The hub 55 is provided with a projecting finger 67 which engages a pin 68 on the pawl 58 to release the latter when the knife is actuated, the pawl 63 being simultaneously released by a pin 69 on the arm 57.

In operation, the pawl 48 is manually released, and the adjusting member 46 positioned, by means of the handle 47, in accordance with the amount of wrapping material required for the work to be wrapped, being held in adjusted position by engagement of said pawl 48 with the fixed ratchet 43. When the machine is started, the controlling ratchet 42 is progressively moved, tooth by tooth, in a clockwise direction, by the pawl 58, moving the pin 51 away from the shoulder 50 and eventually bringing the same into engagement with the arm 57, after a number of rotations of the shuttle depending upon the initial adjustment of the adjusting member 46 and shoulder 50. Engagement of the pin 51 with the arm 57 causes the knife 37 to be depressed to sever the strip S. When said knife is so operated, the finger 67 disengages the pawl 58 from the ratchet 42, while the pin 69 simultaneously disengages the pawl 63 from said ratchet, permitting the spring 52 to turn the latter in a counter-clockwise direction until the pin 51 engages the stop 50, thereby positioning the parts for a second operation. No further adjustment of the parts is required so long as a succession of articles of the same size is to be wrapped, but when the machine is to be used in connection with articles of a different size, the adjusting member 46 will be again adjusted in accordance with the amount of wrapping material necessary for the latter.

Having thus described my invention, I claim:

1. In a machine of the class described, in combination, means for supporting and moving the work to be wrapped, a shuttle, means for rotating said shuttle about the work, means for feeding a strip of wrapping material to said shuttle, and mechanism, including a member progressively moved toward operative position by said shuttle rotating means, for cutting said strip.

2. In a machine of the class described, in combination, means for supporting and moving the work to be wrapped, a shuttle, means for rotating said shuttle in a constant plane about the work, means for feeding a strip of wrapping material to said shuttle, means for cutting said strip, and means operated by said shuttle rotating means for controlling the time of operation of said cutting means.

3. In a machine of the class described, in combination, means for supporting and moving the work to be wrapped, a shuttle, means for feeding a strip of wrapping material to said shuttle, a driving disk for rotating said shuttle, a cam projection on said driving disk, and mechanism actuated by said cam projection for severing the strip of wrapping material.

4. In a machine of the class described, in combination, mechanism for feeding a strip of wrapping material to the work and wrapping the same thereabout, controlling means progressively moved by said wrapping mechanism during the wrapping operation, means automatically operated when said controlling means reaches a predetermined position for cutting said strip, and means for reversing the path of movement of said controlling means.

5. In a machine of the class described, the combination of a shuttle, means for rotating said shuttle to wind a strip on the work, means for guiding the strip to the shuttle, a strip cutting device, and mechanism movable in one direction for operating said device at a predetermined time and thereafter movable in the opposite direction into starting position.

6. In a machine of the class described, in combination, mechanism for feeding a strip of wrapping material to the work and wrapping the same thereabout, means for cutting said strip at a predetermined time, and mechanism for controlling the time of operation of said cutting means including a member progressively moved by said wrapping mechanism during the wrapping operation, an adjustable stop to determine the position from which said member is moved, and means for retracting said member to said position after the cutting operation.

7. In a machine of the class described, in combination, mechanism for feeding a strip of wrapping material to the work and wrapping the same thereabout, a cutter for cutting said strip at a predetermined time, a ratchet having a stud to operate said cutter, a pawl operated by said wrapping mechanism for periodically advancing said ratchet, a holding pawl for said ratchet, devices operated by said cutter for releasing said pawls, a spring for returning said ratchet to its initial position when said pawls are released, a stop engaged by said stud to determine the initial position of said ratchet, an adjusting member by which said stop is carried, and means for locking said adjusting member in adjusted position.

8. In a machine of the class described, in combination, mechanism for feeding a strip of wrapping material to the work and wrapping the same thereabout, a cutter for cutting said strip at a predetermined time, a ratchet having a stud to operate said cutter, a pawl operated by said wrapping mechanism for periodically advancing said ratchet, a holding pawl for said ratchet, devices operated by said cutter for releasing said pawls, a spring for returning said ratchet to its initial position when said pawls are released, a stop engaged by said stud to determine the initial position of said ratchet, an adjusting member by which said stop is carried, a fixed ratchet, and a pawl carried by said adjusting member and co-operating with said fixed ratchet to lock said adjusting member in adjusted position.

9. In a machine of the class described, the combination of revoluble means for winding a strip about the work, means for rotating said means, a strip cutting device, a rotatable member carrying means for actuating said device, and means for intermitating said device, and means for intermittently rotating said member during the rotation of said winding means into position to actuate said cutting device.

In testimony whereof I affix my signature.

GEORGE W. PROUTY.